INVENTOR
JOHN HEWITT ORR
Mawhinney & Mawhinney
ATTYS.

United States Patent Office 2,727,783
Patented Dec. 20, 1955

2,727,783

CONVERTIBLE TOP, INCLUDING A REAR PANEL AND MOUNTING MEANS FOR THE LATTER

John Hewitt Orr, Coventry, England, assignor to Carbodies Limited, Coventry, England Application July 25, 1952, Serial No. 300,802

Claims priority, application Great Britain September 15, 1951

2 Claims. (Cl. 296—107)

The invention relates to an open-type motor-car body of the kind having a foldable head or top of which a flexible covering, when the head is erected, is supported at the rear from the top of the body and at the front from a forward, substantially U-shaped, transverse member of a foldable frame, the latter including a second substantially U-shaped, transverse member which is made fast to and defines the top of a rear panel of the head, the rear panel incorporating a rigid rear light (i. e., a transparent pane providing a view to the rear), and the head being retractable into a stowage compartment which is at the rear and sides of the body and has its outer upper edge defined by the top of the body.

With known constructions of this kind the bottom edge of the flexible covering, at least at the rear, is secured to the top of the body, and the rear light is let into the flexible covering in a position between the top of the body and the said second member of the frame, there being a substantially horizontally-extending strip of the flexible covering above and below the rear light when the head is erected. When the head is stowed in the compartment, the rear light lies substantially vertical, with the remainder of the folded head substantially within the compartment. When raising the head, the said second member must precede the rear light in leaving the compartment, passing the vertical rear light in doing so, and the two said strips must be of sufficient width to allow the rear light to move from the position in which it is hung from the top of the body to that in which it is hung from the said second member. This requirement normally restricts the depth of the rear light to one-third of the height of the rear panel (i. e., when the head is erected).

The main object of the present invention is a construction of a head permitting the height of the rear light to be materially increased proportionally to the height of the rear panel.

According to the invention the bottom edge of the flexible covering, at least at the rear, is secured within and below the top of the compartment, whereby the overall height of the rear panel is increased by the height of the flexible covering extending downwardly (i. e., when the head is erected) into the compartment, and the light provides a greater proportion than one-third of the height of that part of the panel which extends above the top of the body.

Figure 1:
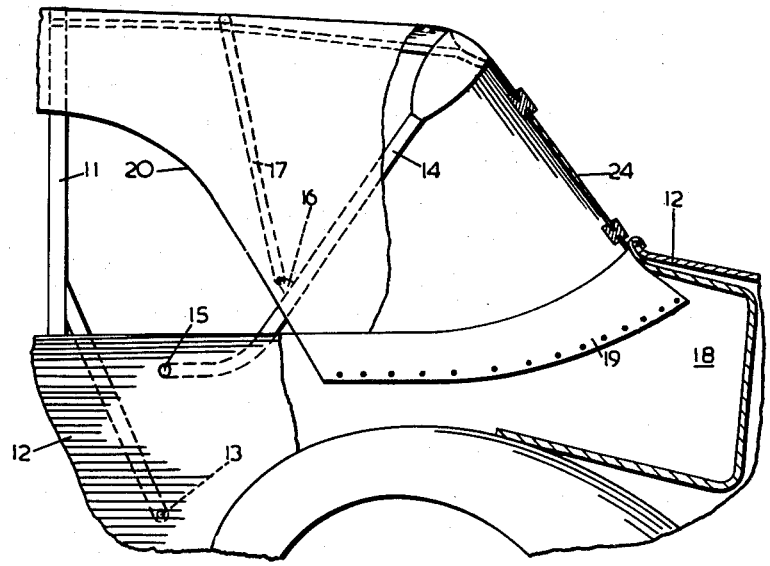
Figure 1 is a side elevation, partly in section, of a rear portion of a motor-car body equipped with one form of head according to the invention, the head being shown in erected position.
Figure 2:
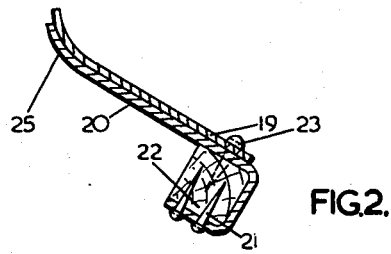
Figure 2 is a sectional detail, to an enlarged scale, of a means of fixing in position the lower edge of the flexible covering.
Figure 3:
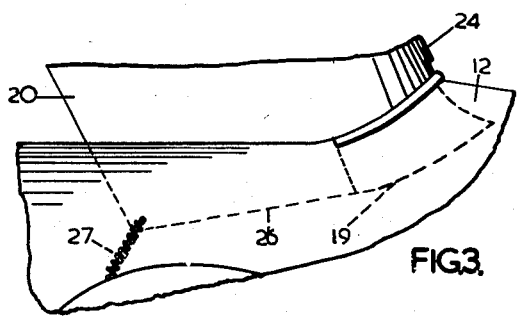
Figure 3 is a view similar to Figure 1 but showing a modified construction.

Referring to the drawings the head frame comprises a forward inverted U-shaped member 11 which is pivoted from the body 12 at 13, and a rear inverted U-shaped member 14 which is pivoted from the body at 15. The member 14 has pivoted to it at 16 the extremities of the arms of an intermediate U-shaped frame member 17.

At the rear and round the sides of the body is a stowage compartment 18 and it has, fast with its upper edge, a downwardly and outwardly flared skirt member 19 of metal. The bottom of the flexible covering 20, at the rear and sides, is brought within the member 19 and is secured at the bottom edge of the latter as by nailing at 21 to a wooden batten 22 which is held by screws 23 to the lower edge of the member 19. The flaring of the latter provides a smoothly convex surface over which the flexible covering 20 is stretched when the head is erected.

Between the upper edge of the body 12 and the rear hoop member 14 is defined a rear panel of the hood in which is supported, in any suitable manner, a rear light 24, and by securing the bottom edge of the flexible covering 20 to the bottom edge of the member 19 there is a strip 25, of the fabric of which the said covering is composed, extending beneath the rear light. It will be seen that in this way the light 24 can be made to be more than one-third of the height of that portion of the rear panel which extends above the body 12.

If the bottom edges of the side portions of the flexible covering 20 are of considerable extent, in the fore-and-aft direction of the body, the member 19 can be made to extend only part-way round the sides, leaving the forwardly-extending bottom edges 26 of the side portions of the covering free of the member 19. In this case, the fronts of the bottom edges 26 can be anchored to the body through extensible spring 27, 27 which maintain a desirable tension in the side portions of the flexible covering when the head is erected. Also, while the head is being stowed, the tension of the springs 27 is in a general direction which will cause the covering to fold appropriately.

What I claim as my invention and desire to secure by Letters Patent of the United States is:

1. An open-type motor-car body having a head comprising a foldable frame pivoted to the body for movement between an erected position in which members of said frame are extended and a position in which the head is folded and stowed in a compartment at the rear and sides of the body, a flexible covering for said head, said covering including a rear panel the top of which is defined by a transverse member of said foldable frame, a rigid transparent pane in said rear panel between upper and lower laps of the flexible covering forming said rear panel, a rigid sheet secured at its top to the top of the outer wall of the compartment and extending downwardly into the latter, said rigid sheet extending round the rear of said compartment, the bottom edge of the flexible covering of said rear panel being secured to the bottom of said rigid sheet whereby the overall height of the rear panel includes the height of the portion of the covering which extends downwardly (i. e., when the head is erected) into the compartment and permits the pane to provide a greater proportion than one-third of the height of that part of the rear panel which extends above the top of the body.

2. An open-type motor-car body having a head comprising a foldable frame pivoted to the body for movement between an erected position in which members of said frame are extended and a position in which the head is folded and stowed in a compartment at the rear and sides of the body, a flexible covering for said head, said covering including a rear panel the top of which is defined by a transverse member of said foldable frame, a rigid transparent pane in said rear panel between upper and lower laps of the flexible covering forming said rear panel, a rigid sheet secured at its top to the top of the outer wall of the compartment and extending downwardly into the latter, said rigid sheet extending round the rear of said compartment, the bottom edge of the flexible covering of said rear panel being secured to the bottom of said rigid sheet whereby the overall height of the rear panel includes the height of the portion of the covering which extends downwardly (i. e., when the head is erected) into the compartment and permits the pane to provide a greater proportion than one-third of the height of that part of the rear panel which extends above the top of the body, said rigid sheet being curved transversely so as to present a smoothly convex surface over which said covering is stretched when the head is erected.

References Cited in the file of this patent

UNITED STATES PATENTS

| | | |
|---|---|---|
| 1,809,505 | Campbell | June 9, 1931 |
| 2,076,243 | Marshall et al. | Apr. 6, 1937 |
| 2,141,842 | Lohrman | Dec. 27, 1938 |
| 2,549,153 | Ackermans | Apr. 17, 1951 |
| 2,569,724 | Machie et al. | Oct. 2, 1951 |

FOREIGN PATENTS

| | | |
|---|---|---|
| 447,641 | Great Britain | May 22, 1936 |